Sept. 9, 1947.  R. B. BURNS  2,427,044
TILE FORMING MACHINE
Filed Dec. 10, 1945  4 Sheets-Sheet 1

ROBERT B. BURNS
INVENTOR
BY Cecil R. Wood
ATTORNEY

Sept. 9, 1947.   R. B. BURNS   2,427,044
TILE FORMING MACHINE
Filed Dec. 10, 1945   4 Sheets-Sheet 2
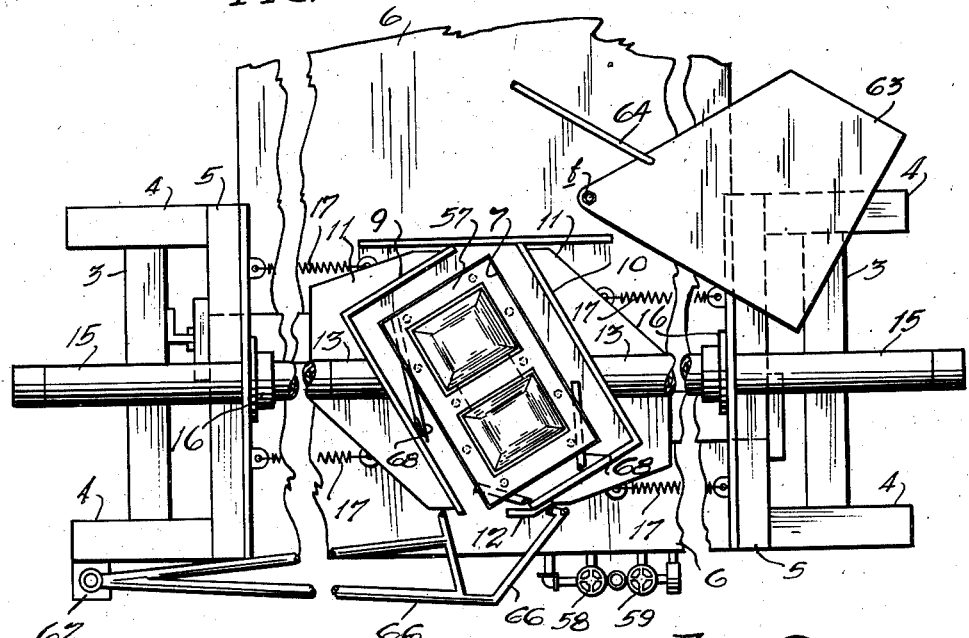
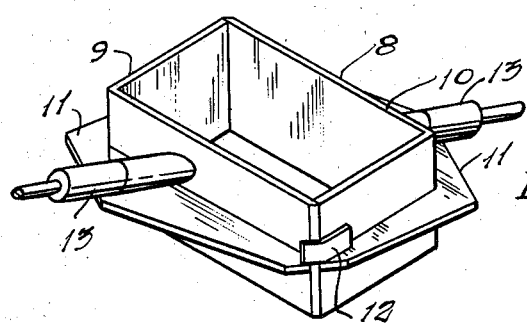
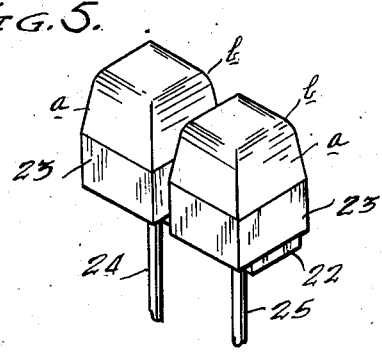
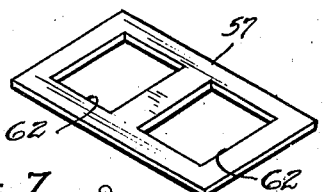
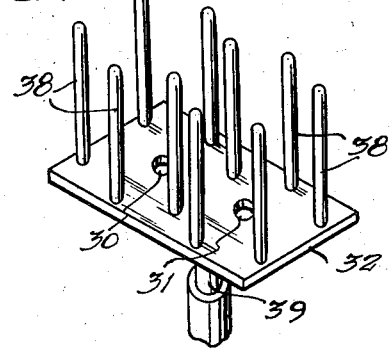
ROBERT B. BURNS
INVENTOR.
BY
ATTORNEY Sept. 9, 1947.    R. B. BURNS    2,427,044
TILE FORMING MACHINE
Filed Dec. 10, 1945    4 Sheets-Sheet 3

ROBERT B. BURNS
INVENTOR
BY Cecil L. Vose
ATTORNEY

Sept. 9, 1947. R. B. BURNS 2,427,044
TILE FORMING MACHINE
Filed Dec. 10, 1945 4 Sheets-Sheet 4
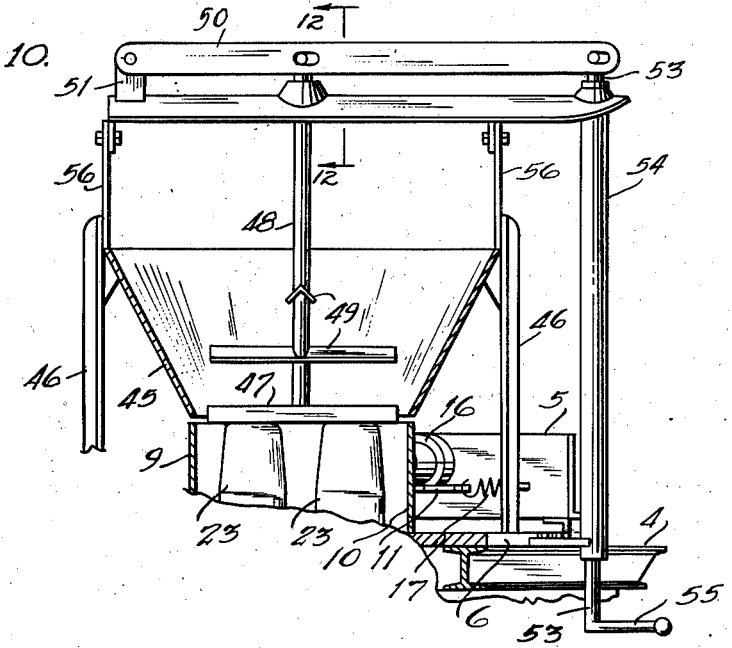
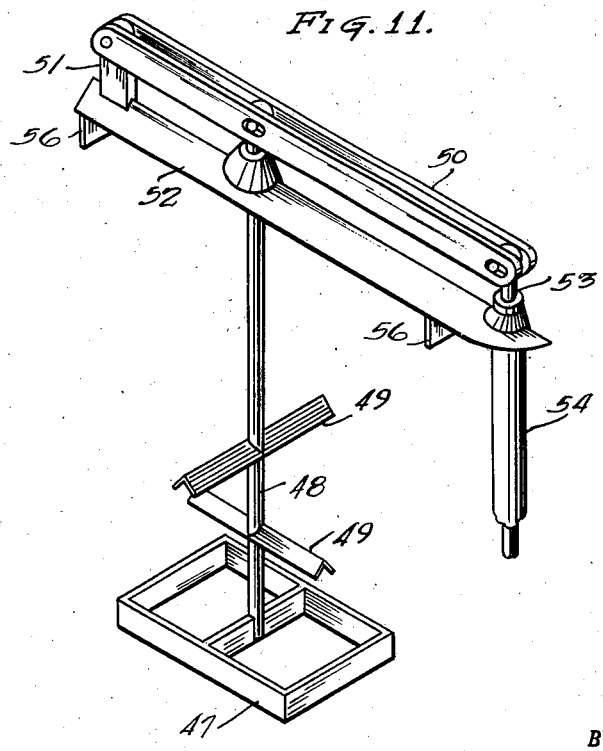
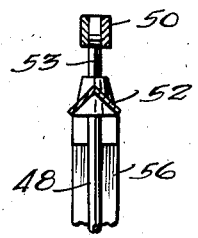
Robert B. Burns
INVENTOR.
BY
ATTORNEY Patented Sept. 9, 1947

2,427,044

UNITED STATES PATENT OFFICE 2,427,044

TILE FORMING MACHINE

Robert B. Burns, Fort Worth, Tex., assignor to Bob Burns Machinery Company, Fort Worth, Tex., a corporation of Texas Application December 10, 1945, Serial No. 633,908

6 Claims. (25—41)

This invention relates to forming or molding apparatus for the production of cement tile or building blocks, or the like, and its principal object resides in the provision of a machine which is capable of forming masonry building units from cement mixtures more compactly and with greater economy than conventional apparatus, due primarily to its automatic features of operation and the provision of a mold capable of being retracted or withdrawn from the finished product whereby a more perfect unit is formed.

Another object of the invention resides in the provision of apparatus in which is embodied an arrangement of elements whereby the formed blocks, or units, can be removed from the mold without the usual stripping operation which often results in the unit being disfigured or marred and frequently porous and containing such imperfections as air pockets, and the like, which serve to impair the unit and result in an inferior product.

Still another object of the invention is manifest in the provision of a machine in which the block forming elements, comprising a rectangular mold, include core members for forming cells in the blocks which may be automatically withdrawn therefrom as the mold is withdrawn thus reducing the likelihood of injury to the finished block since the latter is not disturbed during the operation.

Yet another object of the invention is that of affording an automatic operating arrangement of hydraulic pistons by which the several parts of the mold are actuated in proper sequence to impart a suitable pressure to the composition material while in its forming stage to insure a solid and compact unit and effect the retraction of the mold members without leaving mold marks thereon or flaking off portions of the composition material.

Broadly, the invention seeks to comprehend the provision of apparatus by which concrete or similar tile can be formed with greater ease and economy and of a better quality than can be accomplished by conventional methods and in which it is possible, if desired, to form a unit with various face designs or marks incapable of achievement by stripping the unit from the mold in the usual manner.

While the foregoing objects are paramount, other and lesser objects will become manifest as the description proceeds, taken in connection with the appended drawings wherein:

Figure 3 is another plan view of the invention, taken on lines 3—3 of Figure 1, the hopper being removed, and showing the several parts of the mold in retracted position.

Figure 4 illustrates in perspective, the wall sections of the mold in closed formation, and shows the hydraulic operating rods connected thereto.

Figure 5 shows the cell forming cores in perspective.

Figure 6 is a perspective view showing the block supporting frame.

Figure 7 illustrates, in perspective, the block supporting and elevating unit showing the arrangement of pins thereon.

Figure 10 fragmentarily illustrates the upper portion of the invention showing the agitator assembly in the hopper.

Figure 11 is a perspective illustration of the agitator assembly, and

Figure 12 fragmentarily illustrates a vertical section through the horizontal operating arm of the agitator taken on lines 12—12 of Figure 10.

It is contemplated that the invention may be supported by any suitable frame structure which may consist of pairs of vertical legs 1 and 2 arranged on each end and connected transversely of the assembly by I-beams 3 in the manner shown in Figures 1, 2, 3 and 8. Longitudinal beams 4 complete the frame structure and support the ends of transverse angle bars 5 near each end of the frame structure. An operating table 6, comprising a steel plate of suitable thickness, is arranged upon the frame and is supported by the beams 4 and the angle bars 5.

Figure 1:
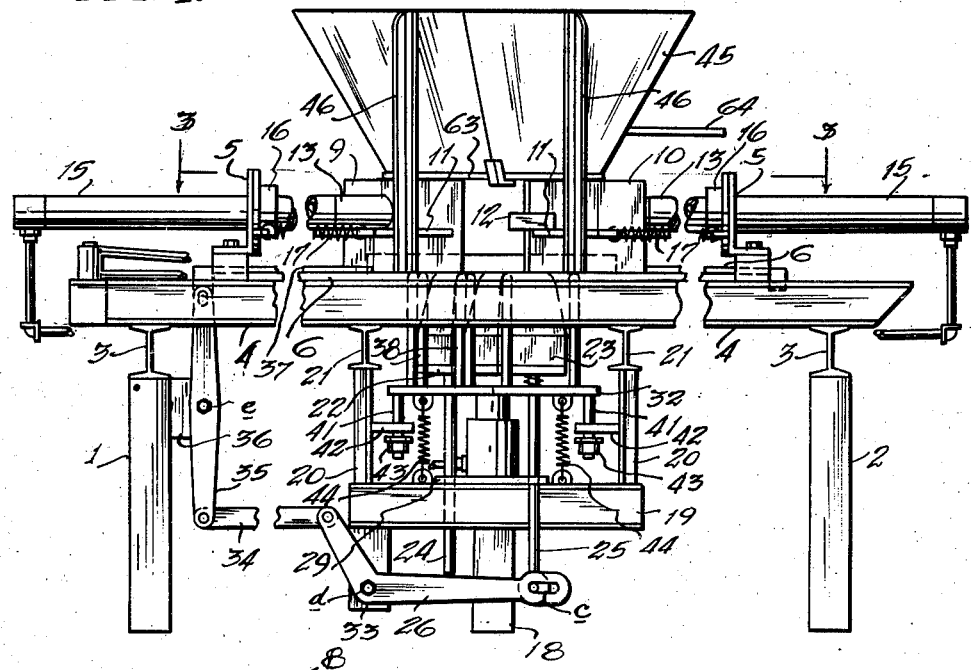
Figure 1 illustrates the invention in front elevation showing the mold sections and mold bottom in retracted position.
Figure 2:
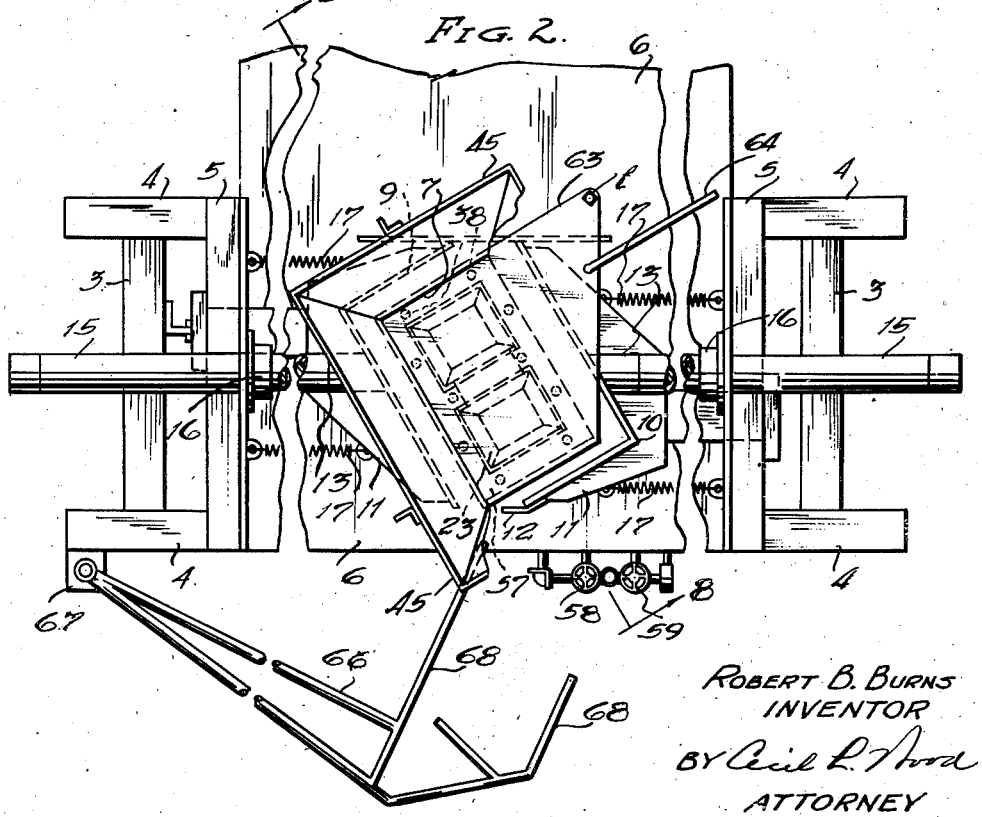
Figure 2 is a plan view of the invention fragmentarily showing the hopper, the hinged closure for the bottom thereof, and illustrating the core elements in dotted lines therebeneath.

A rectangular opening 7 is arranged in the table 6, preferably diagonally thereof, as illustrated in Figures 2 and 3, and a rectangular mold 8, shown in Figure 4, is formed about the opening 7 by wall sections 9 and 10, each L-shaped in plan, which are movable toward and away from the opening along the surface of the table 6 and are illustrated in their respective positions relative to each other and to the opening 7 in Figures 1, 2 and 3. Each of the members 9 and 10 are strengthened by integral fins or gussets 11 arranged horizontally about their rigid corners, as shown in Figures 3 and 4.

The wall sections 9 and 10 each form one side and end of the mold 8 when joined, as in Figure 4, and have guides 12 integral with their shorter wall portions to insure a proper juncture with the opposite section forming opposite corners of the mold 8. Each section 9 and 10 has connected thereto an operating rod 13 which is joined to the outer longer wall portion at an angle so as to be operative longitudinally of the table 6 and each rod 13 has connection with a hydraulic piston 14 in a cylinder 15 supported on each side of the frame structure in the angle bars 5 by a collar 16. As will presently become manifest, the sections 9 and 10 are operated by the pistons 14 and retracted by springs 17 connected to the sections 9 and 10 and the angle bars 5 on each side.

Figure 8:
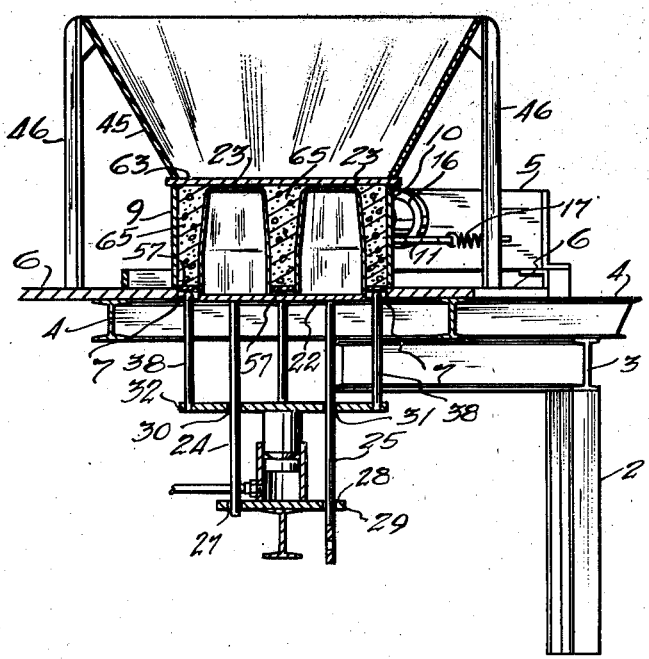
Figure 8 is a vertical section diagonally across the invention, taken on lines 8—8 of Figure 2, showing a block formed in the mold and illustrating the block supporting frame and the hydraulic elevating unit shown in Figure 7.

Beneath the operating table 6 and below the opening 7 is a subframe structure supported by a leg 18 and which comprises horizontal I-beams 19 supporting vertical angle-iron legs 20 which support transverse I-beams 21 arranged beneath and attached to the longitudinal beams 4. The subframe supports the mold table 22 which operates vertically and is adapted to be elevated into the opening 7 to form the bottom of the mold 8 and carries the core members 23 which form the cells in the completed block. The core members 23 are formed with tapered sides a, as illustrated in Figures 5 and 8, and preferably with rounded upper edges b to expedite their withdrawal from the formed block.

The mold table 22 is integrally supported on the upper ends of rods 24 and 25, the former serving to guide the vertical movement of the table 22 and the latter operating to move the same through its sliding connection, at its lower end, with an operating lever 26, shown in Figure 1, which will be described presently. The rods 24 and 25 extend through apertures 27 and 28 in a guide plate 29 integral with the beams 19 of the subframe and through similar apertures 30 and 31 in the hydraulically operated block supporting and elevating plate 32 which is shown in detail in Figure 7 and will be described in greater detail.

Figure 9:
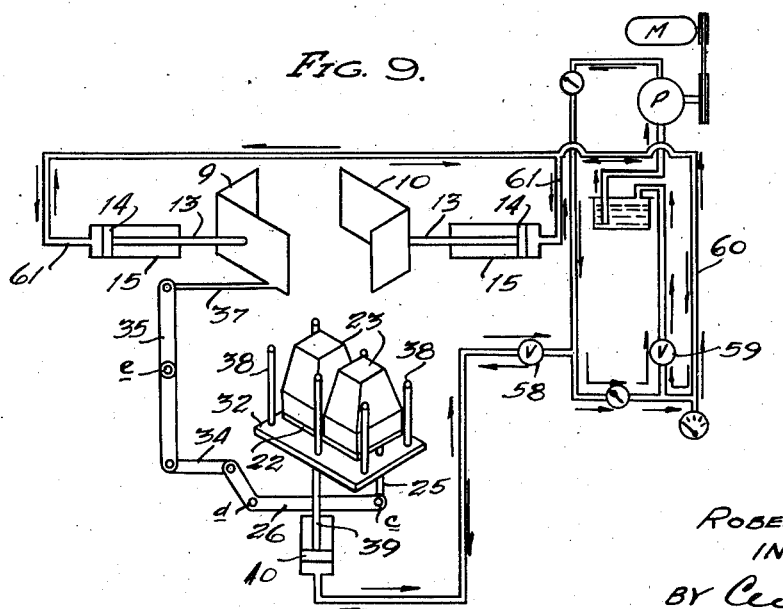
Figure 9 is a diagrammatic illustration of the system of hydraulic conduits by which the invention is operated.

The lever 26, to which the lower end of the rod 25 is slidably connected at c, is pivoted at d to a depending bracket 33 on the subframe and is turned upwardly at an angle from the pivot d and is pivotally connected to a link 34 whose opposite end is pivoted to another lever 35 which is arranged vertically and is pivoted intermediate its ends at e to a bracket 36 integral with one of the I-beams 3, as shown in Figures 1, 2 and 3. The upper end of the vertical lever 35 is pivoted to a rod 37 which provides a rigid linkage between the lever 35 and the mold section 9. A diagrammatic illustration of this arrangement is shown in Figure 9.

Obviously, therefore, when the mold sections 9 and 10 are actuated by the hydraulic pistons 14 the movement of the section 9 raises the mold table 22 by reason of its connection therewith through the lever assembly 26, 34 and 35 and the rod 37, just described. The synchronized cooperation of the mold sections 9 and 10 with the mold table 22 will be more readily understood as the description proceeds.

The block supporting assembly, shown in detail in Figure 7, comprising the elevating plate 32 and a plurality of spaced integral pins 38 projecting upwardly therefrom, is supported and operated by a vertical rod 39 having connection with a hydraulic piston 40. This assembly is arranged for only a limited vertical movement and has guide rods 41 extending downwardly from each end of the plate 32, as shown in Figure 1, and through guide brackets 42 integral with the legs 20 of the subframe structure and have nuts 43 on their ends by which the upward movement of the pins 38 can be limited and controlled. Springs 44 are connected between the underside of the plate 32 and the subframe members 19 to cause the plate 32 and the pins 38 to be drawn downwardly when the hydraulic pressure of the piston 40 is released.

A hopper 45 is arranged above the opening 7 in the table 6, and consequently immediately above the assembled mold 8 thereon, for receiving a suitable composition material which may be placed therein by any suitable means such as a conveyor, or the like (not shown). The hopper 45 may be supported by brackets 46.

An agitator assembly, illustrated in Figures 10, 11 and 12, may be provided for insuring a proper feeding of the mixture into the mold 8 and may consist of a tamping frame 47 integral with the lower end of a vertical shaft 48 having transversely positioned bars 49 thereon and pivotally connected at its upper end to a horizontal lever 50 which is pivoted at one end to a bracket 51, on one end of a horizontal frame member 52, and at its opposite end to a vertical rod 53 which operates within a vertical tubular housing 54 connected to the opposite end of the frame member 52. A handle 55 is formed on the lower end of the rod 53 by which the latter is operated to actuate the agitator assembly. The frame member 52 is connected to the hopper 45 by brackets 56 in the manner shown in Figure 10.

The invention is operated by first placing a block supporting frame 57 in the opening 7 upon the upper ends of the pins 38. The frame 57 is illustrated in detail in Figure 6. Meanwhile the mold table 22 and its core members 23 are down, as exemplified in Figures 1 and 9, and the valve 58 operating the plate 32 is closed. After the frame 57 is in position the valve 59 is closed and the pistons 14 are actuated through the conduits 60 and 61 and the mold sections 9 and 10 are joined to form the mold 8. The operation of these members automatically raises the mold table 22, in the manner previously described, and the mold 8 is complete and ready to receive the composition material.

It will be observed, by reference to Figure 8, that the core members 23, when these elements are raised, project upwardly into the mold 8 through the rectangular openings 62 in the frame 57 and that the latter actually provides the bottom of the mold 8. The material placed in the hopper 45 is allowed to pass into the mold 8 until the latter is filled and a shutter or cut-off plate 63, pivotally connected at f to the hopper 45 or to the frame structure, as desired, is swung around by its handle 64 beneath the hopper 45 and between the latter and the top of the mold 8 and cuts off the mixture 65 and, at the same time, provides a top for the mold 8, as shown in Figure 8. The shutter 63 is shown in detail in Figures 2 and 3.

The valve 59, at this point, may be opened and closed suddenly to tamp and further pack the material 65 by the sections 9 and 10 and the core members 23. This operation will aid in pressing out excess moisture and close air pockets and porosity in the block. The valve 58 may also be opened to apply pressure upwardly on the bottom of the block against the plate 63 through the piston 40. The valve 58 is then closed to retain the plate 32 in raised position and the valve 59 is opened to release the pressure whereupon the mold sections 9 and 10 and the mold table 22 will retract, by the aid of springs 17 and the weight of the table 22, leaving the formed block 65 upon the frame 57 and supported by the pins 38.

While in the supported position upon the pins 38 the block 65 may be removed from the invention by operating a carriage arm 66 which is pivoted to a bracket 67 on one of the frame members 4 and capable of swinging inwardly beneath the frame 57 supporting the block and engaging the same whereupon the valve 58 is opened to release the pressure on the piston 40 allowing the plate 32 and pins 38 to retract and lower the frame 57 upon the fingers 68 and the arm 66 may then be swung outwardly where the block can be removed to a suitable drying and curing rack (not shown). The carriage arm 66 is manually operated. The fingers 68 are spaced to engage the underside of the frame 57 on the outside of the arrangement of supporting pins 38 without touching the same.

Manifestly, certain changes and modifications in the structure herein shown and described may be resorted to from time to time by persons skilled in the art, without departing from the spirit and intent of the invention or the scope of the appended claims.

What is claimed is:

1. In a machine for forming structural tile from cement, or the like, in combination, a frame structure having an operating table, a rectangular opening in said table, a mold section arranged on each side of said opening and movable with respect thereto to form a rectangular mold, a vertically movable mold table capable of moving into said opening to provide a bottom for said mold and receding in synchronized movement with said mold sections, core members on said mold table forming cells in said tile in cooperation with said mold sections, a hopper arranged above said mold for receiving a cement mixture and directing same into said mold, a shutter pivotally connected to said hopper for closing said mold therefrom and hydraulic means automatically actuating said mold members in synchrony.

2. In a machine for forming concrete tile, in combination, a frame structure supporting an operating table having a rectangular opening therein, a pair of mold sections arranged for synchronized horizontal movement on each side of said opening and with respect thereto to form a rectangular mold, a mold table capable of moving vertically into said opening and providing a bottom for said mold, the said mold table having core members thereon for forming cells in said tile in cooperation with said mold sections, a hopper operatively arranged above said mold for receiving a concrete mix and depositing same in said mold, a closure pivotally arranged on said hopper for closing the bottom thereof and providing a top for said mold and hydraulic means automatically actuating said mold sections and said mold table in operative sequence.

3. In a tile forming machine, in combination, a supporting frame supporting an operating table having an opening therein, a pair of mold sections arranged about said opening and capable of opposite horizontal movement with respect thereto to form a mold, an automatically receding mold table arranged below said operating table and capable of moving into said opening to form a bottom for said mold, core members on said mold table for forming cells in said tile in cooperation with said mold sections, a hopper arranged above said mold and having an opening in its lower end to admit moldable material to said mold, a pivotal closure for the said hopper opening and hydraulic means for automatically operating said mold sections and said mold table in operative sequence.

4. In a cement tile machine for forming structural units, in combination, a frame structure supporting an operating table, a rectangular opening in said table, a rectangular mold formed about said opening and comprising vertical sections capable of receding from said opening, a forming table operatively arranged in said opening providing a bottom for said mold and capable of receding downwardly in synchrony with said mold sections, the said forming table having cores thereon for providing cells in said tile, a hopper for a cement mix arranged above said mold and having a bottom closure providing a top for said mold, means for automatically actuating said mold elements in proper sequence and means for supporting the finished tile as the mold elements are withdrawn therefrom.

5. In apparatus for forming cement building blocks, in combination, a supporting frame having an operating table thereon and a rectangular opening in said table, a rectangular mold operatively arranged about said opening comprising a pair of vertical sections capable of receding therefrom, a mold table operatively positioned in said opening providing a bottom for said mold and having core members thereon forming cells in said blocks in cooperation with said sections, a hopper arranged above said mold having a pivoted bottom closure providing a top for said mold, automatic means for actuating the said mold members and means for supporting said blocks when said mold members are withdrawn therefrom.

6. In a molding machine for cement building blocks, in combination, a frame structure having an operating table thereon and a rectangular opening in said table, a rectangular mold operatively arranged about said opening comprising a pair of movable wall sections capable of receding from said opening, a bottom member for said mold movable into said opening and capable of receding downwardly therefrom, core members carried by said bottom member forming cells in said blocks in cooperation with said wall sections, a hopper arranged above said mold for a cement mix and opening into said mold, a closure pivoted on said hopper providing a bottom for said hopper and a top for said mold, means automatically actuating said mold members in proper sequence and means hingedly connected to said frame supporting said blocks as the mold members are withdrawn therefrom.

ROBERT B. BURNS.

REFERENCES CITED

The following references are of record in the file of this patent:

UNITED STATES PATENTS

| Number | Name | Date |
|---|---|---|
| 694,985 | Palmer | Mar. 11, 1902 |
| 949,505 | Snelling | Feb. 15, 1910 |
| 951,723 | Bragstad | Mar. 8, 1910 |
| 829,380 | Ball | Aug. 28, 1906 |
| 2,193,879 | Muenzer | Mar. 19, 1940 |